July 18, 1967 C. J. HOLTKAMP 3,331,929

DIGITAL TIMER DRIVE FOR USE IN HOUSEHOLD APPLIANCES

Filed Oct. 15, 1965

INVENTOR
Calvin J. Holtkamp
BY Edward C. Arenz
ATTORNEY

United States Patent Office 3,331,929

Patented July 18, 1967

3,331,929

DIGITAL TIMER DRIVE FOR USE IN HOUSEHOLD APPLIANCES

Calvin J. Holtkamp, Mansfield, Ohio, assignor to Westinghouse Electric Corporation, Pittsburgh, Pa., a corporation of Pennsylvania Filed Oct. 15, 1965, Ser. No. 496,591
7 Claims. (Cl. 200—46)

This application is a continuation-in-part of my copending and now abandoned application 316,292, filed Oct. 15, 1963.

The present invention relates to timer drive mechanisms, and more particularly to digital timer drive mechanisms for use in household appliances.

Presently known program timers for use with household appliances employ multiple switches and motor drives. This type of timer drive has been used for many years in automatic or semiautomatic household appliances. However, as the number of functions and features increases each year in household appliances, the timer drive is called upon to perform more and more operations. Because of this and the limited nature of their operational capacity, these timer drives have about reached the practical limit of the number of operations that can be performed. Moreover, with the increase in the number of operations, the reliability of the timer drive, of course, decreases.

Other methods of performing the ever increasing number of operations of modern household appliances are thus necessary. One method suggested is to use computer logic elements to perform the same switching operations as do the mechanical switches and motor drives of the old method. The control functions may be performed with a digital timer using a binary number system. The various logic elements required in the control scheme may be fabricated from solid state devices, such as transistors, to operate the various relay switches, etc. of the household appliance. The digital timer may be either completely solid state or could also utilize other components. The difficulty, however, with the solid state method using binary logic elements is that it requires a large number of electrical components, making the control apparatus expensive. Moreover, because of the relative sensitivity of some of the logic components, it may be necessary to use a regulated power supply and also to provide a D.C. power supply as a bias potential.

It is therefore an object of the present invention to provide a new and improved timer drive mechanism.

It is a further object of the present invention to provide a new and improved digital timer drive mechanism for use in household appliances.

It is a further object of the present invention to provide a new and improved digital timer mechanism for use in household appliances without utilizing solid state devices but still providing the necessary number of functions required for the appliance.

Broadly, the present invention provides a timer driver mechanism in which a counter wheel has disposed thereon a plurality of rows of contacts arranged in a binary manner and in which a program number such as a card has a plurality of electrical circuits disposed thereon. The counter wheel is rotated and the card moved in such a manner that predetermined circuits are established by various rows of contacts engaging various circuits of the program card. When the predetermined electrical circuits are established, control functions are set up to be performed in the household appliance.

These and other objects and advantages of the present invention will become more apparent when considered in view of the following specification and drawings, in which.

Figure 1:
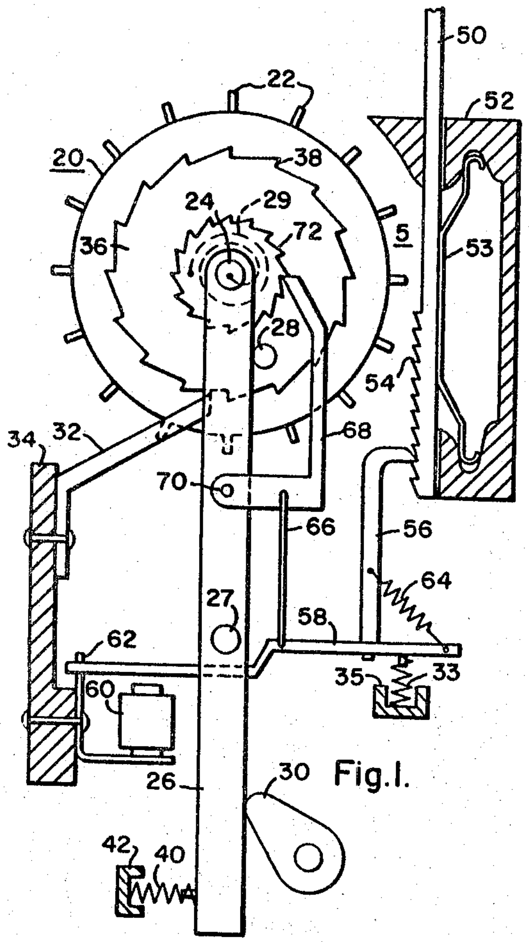
FIGURE 1 is a schematic diagram of the control mechanism of the present invention.

Referring to FIG. 1, a counter wheel 20 is shown having 16 rows of electrically conductive spring loaded pin contacts disposed on the periphery of the wheel 22. At the center axis 24 of the counter wheel 20 is connected a counter wheel arm 26. The counter wheel arm 26 is suspended from the shaft 27 and is free to oscillate back and forth about the shaft 27. The counter wheel arm 26 is so connected that the counter wheel is rotatable about its axis 24. A stop member 28 is placed in the wheel 20 and engages the counter wheel arm 26 at the center position as shown in FIG. 1. A spiral spring 29 is connected between the counter wheel 20 and the axis 24 and is adjusted to provide a clockwise bias force on the counter wheel 20.

A timer motor cam 30 engages the counter wheel arm 26 at its bottom portion away from the counter wheel 20. The cam 30 is rotated by a timer motor, not shown. Upon rotation of the cam 30 an oscillatory motion is imparted to the counter wheel arm 26 and thus to the counter wheel 20; thereby driving the counter wheel 20 to the right and left in response to the rotation of the timer motor cam 30. The timer motor cam may be driven synchronously by the timer motor at a predetermined frequency, for example, having a period of rotation of five seconds. Thus, every five seconds the counter wheel 20 and the counter wheel arm 26 would go through one oscillatory cycle. The cam 30 could also be driven asynchronously if this is desired for specific applications.

A spring-type pawl member 32 is supported by a support member 34 and is disposed adjacent to the counter wheel 20. Placed on and fixed to the counter wheel 20 about its center axis 24 is a ratchet wheel 36 having a plurality of teeth 38 equal in number to the number of rows of pin contacts 22. During the movement of the counter wheel 20 to the left, during its oscillatory cycle, the pawl member 32 will engage one of the teeth 38 of the ratchet wheel 36 thereby causing the counter wheel 20 to rotate in the counterclockwise direction one row position, where it is held by pawl 68 until the next oscillation. A compression spring 40 is connected between the counter wheel arm 26 and a support member 42 to react against the movement to the left of the bottom end of counter wheel arm 26 due to the cam 30 and permit the oscillatory movement, with the counter wheel arm 26 being pivoted about the axle 27.

Figure 2:
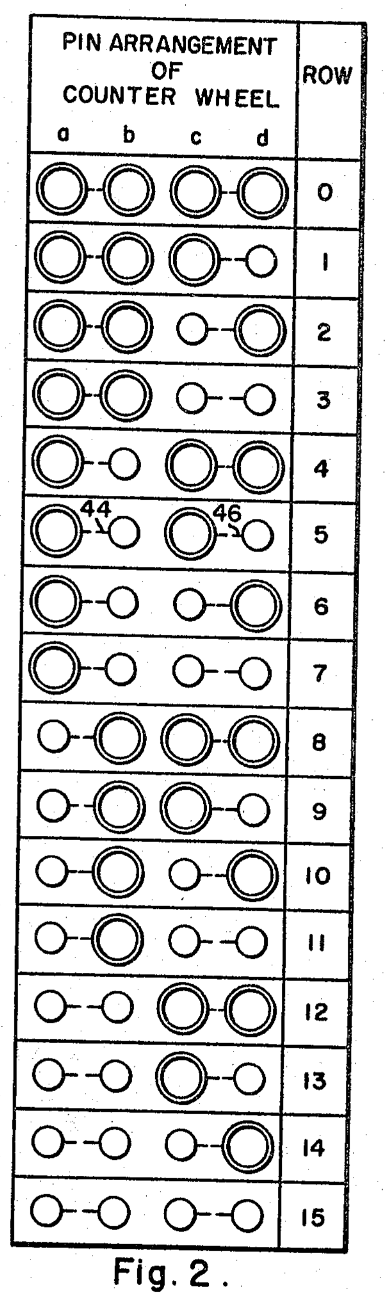
FIG. 2 is a layout view showing the contact arrangement of the counter wheel of FIG. 1.
Figure 3:
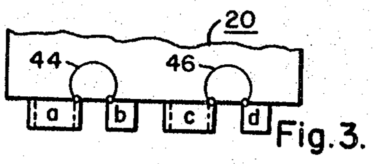
FIG. 3 is a top view showing the electrical connection between contacts of one of the rows of contacts of FIG. 2.

FIG. 2 shows a layout of the contact pin arrangement of the counter wheel 20. As shown, there are four contacts arranged in four columns *a*, *b*, *c*, *d* and arranged in 16 rows designated 0 through 15. The pins are of two types: a hollow tubular type and a smaller diameter solid type. The diameter of the hollow pins is large enough so that a contact of the diameter of the solid pins would fit inside the open space within the hollow pin. The pin contacts are arranged in a binary manner, that is, the different types of pins are so arranged to count in a binary number system. The pins are selected in the present example that the hollow tubular pins represents a "0" binary value, while the solid pins represent a "1" binary value. Thus, four hollow pins arranged in the columns *a*, *b*, *c* and *d* indicate a zero decimal value; a solid pin in the *d* column, and hollow pins in the *a*, *b* and *c* columns indicate a one decimal value; a hollow pin in the *d* column, a solid pin in the *c* column and hollow pins in the *a* and *b* columns indicate a two decimal value; etc., with each of the pins counting successively through decimal values 0 through 15. Other pin shapes or the absence of pins could be used to show the binary counting operation of the wheel. What is essential is that two types of pin be utilized so that "1" and "0" binary values are available to count in the well-known binary notation. Electrical conductors are shown by dotted lines between various of the pins in each of the rows. The system selected in the present example for the counter wheel connects the pins in column *a* to pins in column *b* in each row; and the pins in column *c* to pins in column *d* in each row. FIG. 3 shows a top view of the contact pin structure for the decimal numeral 5, with electrical connections 44 and 46 being shown connected between the solid and hollow pins of the columns *a–b* and *c–d*, respectively.

Referring now back to FIG. 1, a program card 50 is shown fitted into a frame slide 52. The program card 50 is held in the frame 52 by a card spring 53. Also attached to the card frame 52 is a rack 54 having a plurality of teeth. The rack 54 is fitted securely to the card 50 so that the rack and card will move as one unit. Alternately, the card 50 may have incorporated a rack to form a unitary construction.

In order to advance the program card 50 down through the frame 52, a pawl member 56 is provided to engage the teeth of the rack 54. The pawl 56 is connected to a lever arm 58. The lever arm 58 is associated with a solenoid 60 which is secured to the frame member 34. The lever member 58 is pivoted from a support member 62 of the solenoid 60. When the coil of the solenoid 60 is energized the lever arm 58 will be attracted magnetically downwardly toward the solenoid 60, thus imparting a downward motion to the lever arm 58 and the pawl 56, which is affixed to the lever arm 58 and secured thereby by a spring 64. Also connected to the lever arm 58 is a connecting arm 66. A pawl 68 pivoted about an axle 70 on the counter wheel arm 26 is connected to the other end of the connecting arm 66. The pawl 68 is operative with a ratchet wheel 72 which is rigidly secured to the counter wheel 20 about the axis 24 of the counter wheel. The ratchet wheel 72 has the same number of teeth as there are rows of contacts.

As previously explained, as the counter wheel 20 is moved toward the left under the force of the spring 40 as the cam 30 moves away from the counter wheel arm 26, the pawl 32 engages teeth of the ratchet wheel 36 giving the wheel 20 a counterclockwise rotation. When the counter wheel 20 starts to move toward the right during the next portion of the oscillatory cycle as the cam 30 moves against the arm 26, the pawl 68 engages teeth of the ratchet wheel 72 to hold the counter wheel 20 at that particular pin position so that only one row position of the counter wheel is made for each oscillatory cycle. The pawl 68 engaging teeth of the ratchet wheel 72 stops the rotation of the wheel 20 and holds the wheel in position as the wheel oscillates toward the right. The contact pins of the wheel so held in place engage the program board 50 to make contact thereto at the pin position held at that time, row 5 as indicated.

Figure 4:
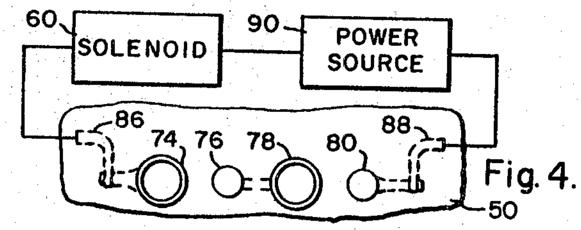
FIG. 4 is a top view showing one of the electrical circuits of a program card as used herein and its connections to external circuitry.
Figure 5:
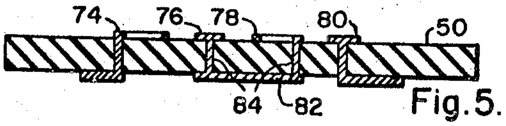
FIG. 5 is a sectional view of FIG. 4.

FIGS. 4 and 5 show a cross section of one of the printed circuits of the plurality disposed on the program card 50. The program board 50 has disposed thereon a plurality of printed circuits so that there are a plurality of circuits arranged one under another along the longitudinal length of the board. The program board 50 may be of the usual printed circuit variety with copper contacts cemened to a board comprising an insulating material. The particular cross section shown has a hollow contact 74, a solid contact 76, a hollow contact 78 and a solid contact 80 disposed on the insulated material surface of the board 50 on the side adjacent to the counter wheel 20. On the other side of the board 50 is a shorting contact 82 which is connected to the contacts 76 and 78 through the leads 84 which pass through the insulating material of the board 50. It will be understood that each row of contacts on the board have jumper connections which complement the jumper connections between contacts in a row on the wheel, as illustrated by the board row 5 of FIGS. 4 and 5. Specifically, the two center columns are jumped in each row on the board.

Two timing pickup brushes 86 and 88 are disposed along the outside edges of the program card 50 to make electrical contact with the outside contacts of the various rows of printed circuits on the program card 50. As shown in FIG. 4, the pickup brush 86 makes conact with the contact 74 while the pickup brush 88 makes contact with the contact 80. If desired, the individual contacts in each outside column of the board may be shorted to each other. The pickup brush 86 is electrically connected to the solenoid 60. The other end of the electrical connection of the solenoid 60 is connected to a power source 90 which in turn is connected to the other pickup brush 88 to complete the electrical circuit. The power source 90 may be the local A.C. source used to drive the appliance.

Assuming that it is the numeral 5 that is to establish or limit the time dwell, at the time the row 5 engages the printed circuit board a predetermined circuit relationship must exist between the contact pins of the counter wheel 20 and the program card 50. At this time assume that the program card is in such a position so that the pins will engage the printed circuit as shown in FIGS. 3, 4, and 5. With the counter wheel 20 moving to the right, the hollow contact pin of column *a* will engage the hollow contact 74 of the card 50; the solid contact of row *b* of the counter wheel 20 will engage the solid contact 76 of the card 50; and the hollow contact of row *c* and the solid contact of row *d* of the counter wheel 20 will engage the hollow contact 78 and solid contact 80, respectively, of the card 50. Since the contacts 76 and 78 of the card 50 are electrically connected and since the contacts of the columns *a* and *b* are connected by the lead 44 and the contacts of the columns *c* and *d* are connected by the lead 46, a complete electrical circuit will be provided from the selonoid 60, pickup brush 86, contact 74, contact of column *a* lead 44, contact of column *b*, contact 76, connections 84 and 82, contact 78, contact of column *c*, lead 46, contact of column *d*, contact 80, pickup brush 88 to the power source 90 and to the solenoid 60. With this circuit being completed, the solenoid 60 will be energized and will attract the lever arm 58 and draw it downwardly. The downward movement of the lever arm 58 will cause the pawl 56 to engage the rack 54 to move the program card 50 downwardly one row to a new position. The downward movement of the lever arm 58 also causes the pawl 68 to be drawn away from the ratchet wheel 72, which in turn under the force supplied by the spiral spring 29, between the wheel 20 and the axis 24, allows the wheel 20 to return to its initial pin position at 0 and with the counter wheel arm resting against the stop 28. Thus, the counter wheel 20 rotates clockwise under the force of the spiral spring 29 which is baised to return the wheel 20 to its original timing position at the 0 pin position. The movement of the wheel 20 away from the program card 50 breaks the circuit and thereby deenergizes the solenoid 60, which is of the conventional type provided with a time delay after deenergization to permit the lever arm 58 to return to its normal position under the compressive force or spring 33 acting against support member 35.

During the next oscillatory cycle when the counter wheel arm moves from its center position to the left, the pawl 32 will engage the ratchet wheel 36 to move the counter wheel 20 counterclockwise to its next pin position 1 to repeat the cycle until the counter wheel 20 again matches the printed circuit. It will be appreciated of course that the hollow contacts and solid contacts on the wheel make contact only with hollow contacts and solid contacts respectively on the card. That is, when a hollow contact on the wheel opposes a solid contact on the card, and the wheel moves to the card, the hollow contact encompasses the solid contact but does not touch it. Hence, it is only when the wheel row matches the card row that the circuit is completed. When a circuit is completed through the solenoid 60, the solenoid will be energized to cause the card 50 to move downwardly one row, as discussed above. In addition the counter wheel 20 will move back to its original 0 position under the action of the spiral spring 29. The eventual advancement of the printed card 50 sets up a predetermined function in the appliance or apparatus being controlled. The program card 50 will thus not advance until a circuit is completed between the contact pins of the counter wheel and the printed circuit of the card 50.

A very versatile timer drive mechanism is therefore provided. With $n$ pins per row on the counter wheel, there would be $2^n$, number of steps that can be utilized, each having a different combinaion of pins. A 4 pin per row counter wheel would give $2^4$ or 16 different combinations. If five pins per row were used, there would be $2^5$ or 32 steps; with a six pin per row unit there would be $2^6$ or 64 different steps.

It is noted, however, that where $n$ is an odd number, special care must be used in the jumper arrangement between contacts in a row. Whenever $n$ is an even number, the contacts along both edge columns on the board are not jumped to the adjacent contacts in their respective rows, and no problem exists of prematurely completing a circuit when certain contact rows mismatch. But if an odd number of columns is used to obtain a desired number of contact rows, such as 5 contacts per row to obtain 32 steps, or 7 contacts per row to obtain 128 steps, then a problem arises if one edge column or the opposite edge column has each of its contacts connected to each adjacent contact in the same row. What happens is that when a match of all of the contacts in a row except the outside one which is jumpered to the adjacent one occurs, the circuit is prematurely completed.

One way of circumventing that problem is to provide an additional column of contacts whenever $n$ is an odd number, and retain the general arrangement of complementary alternating jumpers on the board and wheel. As a specific example, if 32 (i.e., $2^5$) steps are to be provided, each row of contacts on both the board and wheel will include 6 contacts across. On the board, in each row, jumpers are provided between the second and third, and fourth and fifth column contacts only; while on the wheel, jumpers are provided between the first and second, third and fourth, and fifth and sixth column contacts. Thus, the alternating, complementary jumper arrangement on the wheel and board is preserved. The additional column of contacts on the board always matches the additional column of contacts on the wheel up to the step which exceeds $2^n$ where $n$ is odd. Thus, the "extra" column of contacts up through 32 rows always matches on the wheel and board and does not interfere with the steps up through 32. The six columns of contacts will of course provide up to 64 steps in as many rows. From 65–128 steps, eight columns of contacts may be used in the same fashion, with the eight columns being sufficient to provide up through 256 steps by providing that many rows of eight columns.

An alternate arrangement is to simply use $n$ columns of contacts to obtain $2^n$ steps, but connect one end of the solenoid-power source circuit through an edge column set of contacts on the wheel. With five columns of contacts on the board arrangement with the jumpers between the first and second, the third and fourth, and with the fifth column contacts connected to the one end of the solenoid-power source circuit, then the five columns on the wheel are arranged with the first being connected to the other end of the solenoid-power source circuit through a slip ring or similar conductive connection, and the second and third, and fourth and fifth column contacts are jumpered in each row. This system of completing the circuit at the correct match of wheel to board is also applicable with other odd numbers of columns. Choosing an oscillation period of five seconds for a four pin per row unit would give a time period per printed circuit advancement of from 5 seconds up to 80 seconds (5×16), in 5 second increments, to perform each operation of the appliance being controlled. If a six pin per row unit were used the time for operation of any program would be from 5 seconds to 320 seconds in 5 second increments. Such time combinations are more than adequate for most household appliance operation.

Thus, by inserting a program card 50, programmed to perform predetermined functions in a timed manner, into the frame 52 until the pawl 56 engages the rack 54, this would set up the first operation of the household apparatus, for example, in an automatic washer to turn the main motor on, cause the fill valve to open and the timer motor to operate. With the timer motor operating the counter wheel will oscillate back and forth engaging the card 50 once each 5 seconds until a circuit match with the wheel occurs. The card is then advanced 1 step which could be a continuation of the wash period or the next operation which could be to activate the drain solenoid, for a period of perhaps 20 seconds (4 oscillations of the wheel). This would be done by having the auxiliary printed circuit on the card 50 set up the proper circuit. When the pins and printed circuit coincide to complete a circuit to the solenoid 60, the program card 50 will advance one step as explained above. The advancement of the card 50 will set up the circuit that will energize the drain solenoid. The time between the turning on of the appliance and the operation of the drain solenoid in the example given with four pins per row could vary between 5 seconds and 80 seconds in 5 second intervals, depending upon which of the pin combinations will coincide with the printed circuit on the program card 50. The program card 50 will then remain in that position until the next operation is desired. For example, if the next operation is the spin cycle, the card 50 would then be advanced to set up the necessary circuit to start the spin cycle of a washing operation. This process would continue until the washing cycle was completed and the washer is automatically turned off. The time between each of the cycles, in the four pin example, could vary between five and 80 seconds in five second increments which should be an adequate amount of time for each of the operations. If not, a six pin counter wheel, for instance, could be utilized, with the six pin unit giving a range of 5 seconds to 320 seconds, in 5 second increments between operations, or a longer increment or oscillation period could be chosen.

Some additional advantages of the digital timer drive described above may also be noted. The timer drive is very flexible in its utilization of different programs and a variety of times to perform each of the functions of the program. The program card utilized can be made of the usual printed circuit board materials and thus would be of low cost and easy to use and be replaced with new cards. Various different cards could be provided for different fabrics, different cycles, operations, etc. Even though mechanisms which use contacts are prone to unreliability, since the contacts in the present application are constantly being used and being wiped clean there should be a high degree of reliability. Moreover, and even though the counter wheel pin arrangement rows has a limited number of counting operations compared, for example, with solid state logic elements, for most household appliance applications it is more than adequate to provide the necessary length of time for each operation and the necessary overall time for a complete cycle of operation.

Although the present invention has been described with a certain degree of particularity, it should be understood that the present disclosure has been made only by way of example and numerous changes in the details of construction and combination and arrangement of parts may be resorted to without departing from the scope and the spirit of the present invention.

I claim as my invention:

1. In a timer drive mechanism, the combination of: a counter member rotatable about its axis and having disposed thereon a plurality of rows of indicia, said indicia being sequentially arranged in a coded manner; driving means to oscillate said counter member; rotating means operative to rotate said counter member about its axis in response to the oscillation of said counter member; a programmed card including a plurality of indicia disposed thereon, said card being disposed so that the indicia of said card is engageable selectively by the indicia of said counter member; advancing means to move said card in response to a predetermined circuit relationship being established between said indicia of said card and said counter member and thereby setting up circuits to control predetermined functions, and means resetting said counter member to its original rotative position in response to said predetermined circuit relationship being established.

2. In a timer drive mechanism, the combination of: a counter wheel rotatable about its axis and having disposed thereon a plurality of rows of contacts, said contacts being arranged in the rows in a binary manner; driving means to oscillate said wheel; rotating means operative to rotate said wheel about its axis in response to the oscillation of said wheel; a programmed card including a plurality of printed circuits disposed thereon arranged in rows and in a predetermined manner, said card being disposed so as to be engaged selectively by rows of said contacts during one portion of the oscillatory cycle of said wheel; advancing means to move said card in response to a predetermined circuit relationship being established between a particular printed circuit of said card and a particular row of contacts of said wheel and thereby setting up predetermined circuits in a timed manner; and counter wheel resetting means to restart the timing at the original position of said counter wheel.

3. In timed-function control apparatus for use in household appliances, the combination of: a counter wheel rotatable about its axis and having disposed on the periphery thereof a plurality of rows of contacts, said contacts being arranged in the rows in a binary manner; driving means to oscillate said wheel; rotating means operative to rotate said wheel about its axis one row position in response to each cycle of oscillation; a programmed card including a plurality of printed circuits disposed thereon arranged in rows and in a predetermined manner, said card being disposed so as to be engaged by one row of contacts during one portion of the oscillatory cycle of said wheel; and advancing means to move said card one row at a time in response to a particular row of contacts establishing a predetermined circuit relationship with the timing portion of the printed circuit of said card during the engaging portion of the oscillatory cycle of said wheel and thereby setting up predetermined functions in the household appliance.

4. In timed-function control apparatus for use in household appliances, the combination of: a counter wheel rotatable about its axis and having disposed on the periphery thereof a plurality of rows of contacts, said contacts being arranged in the rows in a binary manner so that there will be $2^n$ different contact arrangements, where the number of contacts per row is at least equal to $n$; driving means to oscillate said wheel about a pivotal mounting; rotating means operative to rotate said wheel about its axis one row position in response to each cycle of oscillation; a programmed card including a plurality of printed circuits disposed thereon arranged in rows and in a predetermined manner, said card being disposed so as to be engaged by one row of contacts during one portion of the oscillatory cycle of said wheel; and advancing means to move said card one row at a time in response to a particular row of contacts establishing a predetermined circuit relationship with a particular printed circuit of said card during the engaging portion of the oscillatory cycle of said wheel and thereby setting up predetermined functions in the household appliance and where the length of time permitted for each function may vary between the time period of the oscillatory cycle and $2^n$ times the time period.

5. In a digital timer drive mechanism for use in household appliances, the combination of: a counter wheel rotatable about its axis and having disposed on the periphery thereof a plurality of rows of contacts, said contacts being arranged in the rows in a binary manner; a pendulum member operatively connected to said wheel and being pivotally mounted; driving means engaging said pendulum member to oscillate said wheel about the pivotal mounting; rotating means operative to rotate said wheel about its axis one row position in response to each cycle of oscillation; a programmed card including a plurality of printed circuits disposed thereon arranged in rows and in a predetermined manner for timing and for auxiliary circuit set up, said card being disposed so as to be engaged by one row of contacts during one portion of the oscillatory cycle of said wheel; locking means to hold said wheel in a fixed position during the engaging portion of the oscillatory cycle; advancing means to move said card one row at a time in response to a predetermined circuit relationship being established between a particular printed circuit of said card and a row of contacts of said wheel and thereby setting up predetermined functions in the household appliance; and counter resetting means to return said counter wheel to its original position and restart the timing.

6. In timed-function control apparatus for use in household appliances, the combination of: a counter wheel rotatable about its axis and having disposed on the periphery thereof a plurality of rows of contacts, said contacts being arranged in the rows in a binary maner so that there will be $2^n$ different contact arrangements, where the number of contacts per row is at least equal to $n$; a pendulum member operatively connected to said wheel and being pivotally mounted; driving means engaging said pendulum member to oscillate said wheel about the pivotal mounting; rotating means operative to rotate said wheel about its axis one row position in response to each cycle of oscillation; a programmed card including a plurality of printed circuits for timing and control arranged in rows and in a predetermined manner disposed thereon; said card being disposed so as to be engaged by one row of contacts during one portion of the oscillatory cycle of said wheel; locking means to hold said wheel in a fixed position during the engaging portion of the oscillatory cycle; advancing means to move said card one row at a time in response to a particular row of contacts establishing a predetermined circuit relationship with a particular printed circuit of said card during the engaging portion of the oscillatory cycle of said wheel and thereby setting up predetermined functions in the household appliance and where the length of time permitted for each function may vary between the time period of the oscillatory cycle and $2^n$ times the time period in increments of the time period; and counter wheel resetting means to return said counter wheel to its original position and restart the timing.

7. In a timer drive mechanism, the combination of: a counter member rotatable about its axis and having disposed thereon a plurality of rows of indicia, said indicia being arranged in a coded manner; means to rotate said counter member about its axis in steps to present successive ones of said rows of said counter indicia in sequence; a programmed member including a plurality of indicia arranged thereon, said programmed member being disposed so that its said indicia may be selectively in registry with said counter member indicia; advancing means to move said programmed member in response to a predetermined matching relationship being established between said programmed member indicia and said counter member indicia and thereby setting up circuits to control predetermined functions; and, means resetting said counter member to its original rotative position in response to said predetermined matching relationship being established.

References Cited

UNITED STATES PATENTS

| | | | |
|---|---|---|---|
| 469,652 | 2/1892 | Jennings | 200—46 X |
| 622,607 | 4/1899 | Cox | 200—46 X |
| 758,342 | 4/1904 | Wahl | 200—46 X |

BERNARD A. GILHEANY, *Primary Examiner.*

H. E. SPRINGBORN, *Assistant Examiner.*